United States Patent
Willie et al.

(10) Patent No.: US 9,416,801 B2
(45) Date of Patent: Aug. 16, 2016

(54) VENTILATED DRAINAGE SYSTEM

(71) Applicant: The Boeing Company, Chicago, IL (US)

(72) Inventors: Robert Henry Willie, Bothell, WA (US); David F. Cerra, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/302,676

(22) Filed: Jun. 12, 2014

(65) Prior Publication Data

US 2015/0361999 A1    Dec. 17, 2015

(51) Int. Cl.

| | |
|---|---|
| *F15D 1/00* | (2006.01) |
| *B64D 29/00* | (2006.01) |
| *B64D 37/00* | (2006.01) |
| *B64C 1/14* | (2006.01) |
| *B64D 37/26* | (2006.01) |
| *F01D 25/32* | (2006.01) |

(52) U.S. Cl.
CPC .............. *F15D 1/001* (2013.01); *B64C 1/1453* (2013.01); *B64D 29/00* (2013.01); *B64D 37/005* (2013.01); *B64D 37/26* (2013.01); *F01D 25/32* (2013.01); *F15D 1/008* (2013.01); *Y10T 137/0391* (2015.04); *Y10T 137/2082* (2015.04)

(58) Field of Classification Search
CPC ........ B64C 1/1453; B64C 23/06; B64C 7/02; B64D 33/04; B64D 25/00; F01D 25/32
USPC ...................................................... 244/129.1
See application file for complete search history.

(56) References Cited

U.S. PATENT DOCUMENTS

| | | | | |
|---|---|---|---|---|
| 1,957,075 | A | * | 5/1934 | Morgensen, Jr. .............. 244/136 |
| 2,248,308 | A | * | 7/1941 | Rice .......................... 244/135 R |
| 2,283,502 | A | | 5/1942 | Hughes et al. |
| 5,655,732 | A | * | 8/1997 | Frank .................... B64C 1/1453  239/171 |
| 7,546,981 | B2 | * | 6/2009 | Hoffjann et al. ............... 244/136 |
| 2009/0133376 | A1 | * | 5/2009 | Zysman ....................... 60/39.08 |
| 2011/0121137 | A1 | | 5/2011 | Sandiford |
| 2013/0327059 | A1 | * | 12/2013 | Richardson ..................... 60/797 |

OTHER PUBLICATIONS

Extended European Search Report, dated Oct. 20, 2015, regarding Application No. EP15165610.5, 7 pages.

* cited by examiner

*Primary Examiner* — Tien Dinh
*Assistant Examiner* — Vicente Rodriguez
(74) *Attorney, Agent, or Firm* — Yee & Associates, P.C.

(57) ABSTRACT

A method and apparatus for draining fluid from a structure on an aircraft. The apparatus comprises a drainage tube, a housing, a number of inlet holes in the housing, and a number of outlet holes in the housing. The drainage tube has first end that connects to a structure on an aircraft and a second end opposite the first end. The housing connects to the structure. The drainage tube is located within the housing. Air flows into the housing during flight of the aircraft through the number of inlet holes in the housing. The air flows out of the housing during flight of the aircraft through the number of outlet holes. The air flowing into the housing through the number of inlet holes and out the housing through the number of outlet holes directs fluid out of the drainage tube and away from the structure during flight of the aircraft.

20 Claims, 13 Drawing Sheets

US 9,416,801 B2

VENTILATED DRAINAGE SYSTEM

BACKGROUND INFORMATION

1. Field

The present disclosure relates generally to draining fluids and, in particular, to draining fluids from a structure on a mobile platform. Still more particularly, the present disclosure relates to a method and apparatus for draining fluid away from the structure during various stages of operation of the mobile platform.

2. Background

Drainage systems are often used to drain fluids from mobile platforms. For example, a drainage system may be used to drain fluids from an aircraft during operation of the aircraft. A drainage system may be used to drain leaking fuel, hydraulic fluid, water, or other types of fluids from the structure. These drainage systems are employed to dispose of unneeded fluids and prevent undesired contact between the drained fluids and the mobile platform.

Some drainage systems include a drainage tube extending from the outer surface of the structure. The length, size, and shape of the drainage tube may be altered to modify the amount of fluid drained from the tube. For instance, the size of an opening in the tube may be increased to increase the amount of fluid drained from the tube. Gravity causes the fluid to flow out of the structure, through the drainage tube, and into the environment surrounding the mobile platform.

During movement, the forward motion of the mobile platform may force the fluid draining from the drainage tube back onto the structure. Contact between the drained fluid and the mobile platform may be undesirable in some instances. For example, re-entry of fluids into an aircraft engine may degrade performance of the engine. Some fluids may cause inconsistencies in the paint on the structure. These inconsistencies may reduce the aesthetics of the structure and may result in repainting of portions of the structure.

To prevent fluid from being forced back onto the mobile platform during flight, the drainage tube may be lengthened to provide a desired drainage path for the fluid. Shields also may be placed over the drainage tube to reduce back splatter of the fluid onto the mobile platform. These modifications, however, may increase the weight of the drainage system more than desired and increase the drag of the mobile platform.

Further, longer drainage systems may not provide a desired level of clearance above the ground as the mobile platform moves on the ground. Therefore, it would be desirable to have a method and apparatus that take into account at least some of the issues discussed above, as well as other possible issues.

SUMMARY

In one illustrative embodiment, an apparatus comprises a drainage tube, a housing, a number of inlet holes in the housing, and a number of outlet holes in the housing. The drainage tube has first end that connects to a structure on a mobile platform and a second end opposite the first end. The housing also connects to the structure. The drainage tube is located within the housing. Air flows into the housing, during movement of the mobile platform, through the number of inlet holes in the housing. The air flows out of the housing, during the movement of the mobile platform, through the number of outlet holes. The air flowing into the housing through the number of inlet holes and out of the housing through the number of outlet holes directs fluid out of the drainage tube and away from the structure during the movement of the aircraft.

In another illustrative embodiment, a method of draining fluid from a structure on a mobile platform is provided. Air moves through a number of inlet holes into a housing of a drainage system connected to the structure. The air circulates within the housing. The air moves through a number of outlet holes in the housing. The fluid drains from a drainage tube located in the housing. The air flowing into the housing through the number of inlet holes and out the housing through the number of outlet holes directs the fluid out of the drainage tube and away from the structure during movement of the mobile platform.

In yet another illustrative embodiment, a drainage system for a structure on an aircraft comprises a drainage tube, a housing, a number of inlet holes, and a number of outlet holes. The drainage tube is physically associated with the structure. The drainage tube drains a fluid from the structure. The housing is physically associated with the structure. The drainage tube is located within the housing. The number of inlet holes is located on a leading edge of the housing. Air flows into the housing through the number of inlet holes during flight of the aircraft. The air flows out of the housing during flight of the aircraft through the number of outlet holes. The air flowing into the housing through the number of inlet holes and out of the housing through the number of outlet holes directs the fluid out of the drainage tube and away from the structure such that splatter of the fluid on the aircraft is reduced.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it may be desirable to have a drainage system for a mobile platform that reduces splatter of drained fluid back onto the mobile platform. This mobile platform may be, for example, without limitation, an aircraft. The illustrative embodiments recognize and take into account that the drainage system must reduce this back splatter to within selected tolerances in order to pass various drainage certification tests for the mobile platform. A failed drainage certification test results in costly rework and modification of the drainage system to achieve compliance with certification requirements.

The illustrative embodiments recognize and take into account that compliance with certification requirements often requires manufacturers to lengthen the drainage system to ensure the fluid flows away from the mobile platform in a desired manner. However, making such modifications to the drainage system increases the overall weight and complexity of the mobile platform. The illustrative embodiments further recognize and take into account that adding heavy components to the drainage tube or lengthening the drainage tube increases drag, which reduces the overall aerodynamic performance of the mobile platform.

In addition, the illustrative embodiments recognize and take into account that lengthening the drainage system to prevent back splatter may not be feasible in some instances. For example, a lengthened drainage tube may scrape the ground during operation of the mobile platform, contact objects underneath the aircraft during ground operation, or both. As an example, when the mobile platform is an aircraft, a lengthened tube may scrape the ground during takeoff.

Thus, the illustrative embodiments provide a method and apparatus for draining fluid from a structure on a mobile platform. An apparatus comprises a drainage tube, a housing, a number of inlet holes in the housing, and a number of outlet holes in the housing. The drainage tube has a first end that connects to the structure on the mobile platform and a second end having an opening. The housing also connects to the structure. The drainage tube is located within the housing. Air flows into the housing during movement of the mobile platform through the number of inlet holes in the housing. The air flows out of the housing during the movement of the mobile platform through the number of outlet holes. The air flowing into the housing through the number of inlet holes, through the housing, and out of the housing through the number of outlet holes directs fluid out of the drainage tube and away from the structure during the movement of the mobile platform.

Figure 1:
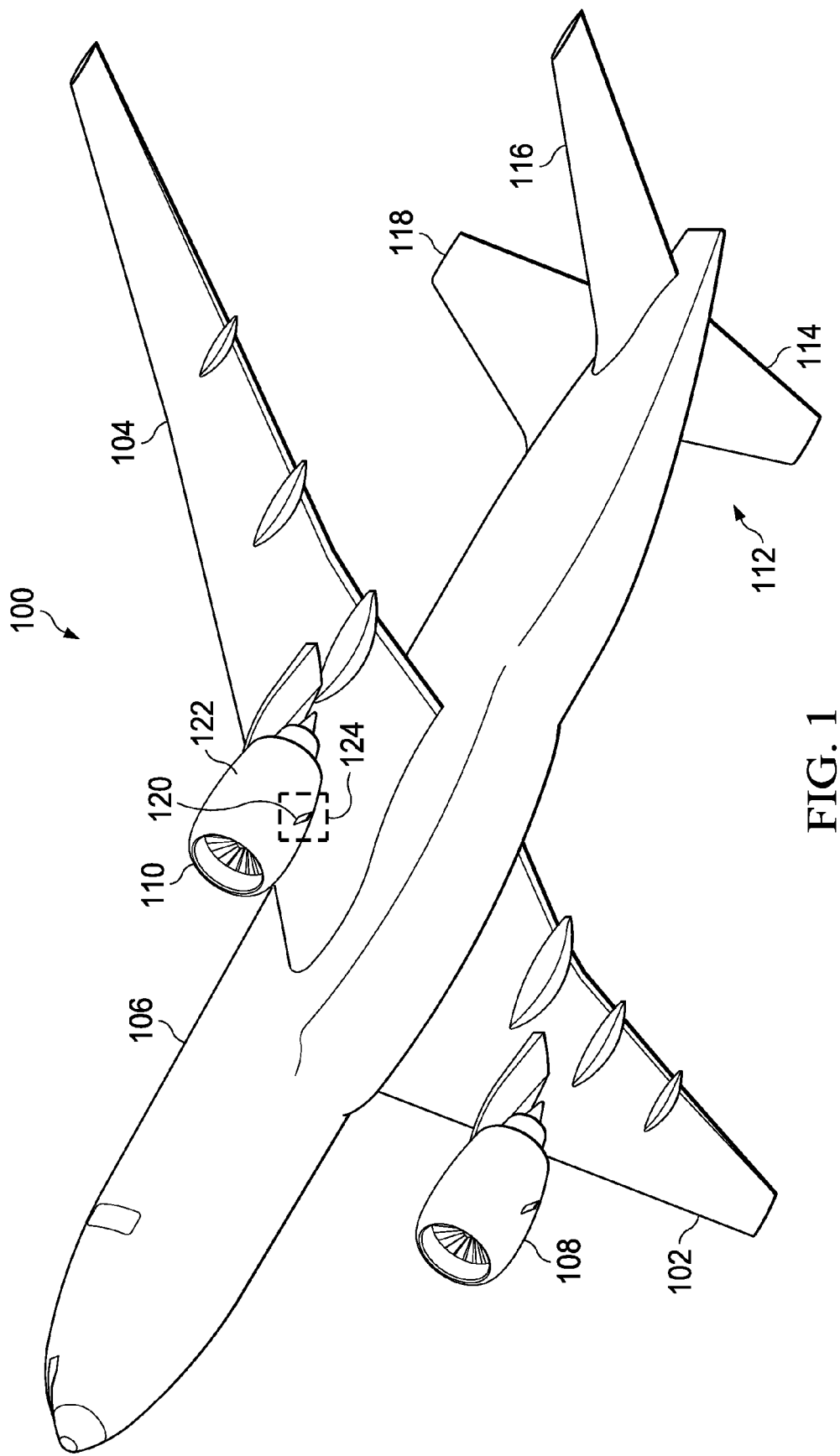
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to fuselage 106. Aircraft 100 includes engine 108 attached to wing 102 and engine 110 attached to wing 104.

Fuselage 106 has tail section 112. Horizontal stabilizer 114, horizontal stabilizer 116, and vertical stabilizer 118 are attached to tail section 112 of fuselage 106.

Aircraft 100 is an example of a mobile platform in which a drainage system in accordance with an illustrative embodiment may be implemented to drain fluids. For example, drainage system 120 is used to drain fluid from engine 110 in aircraft 100. Drainage system 120 extending outward from nacelle 122 of engine 110 is shown in section 124.

Figure 2:
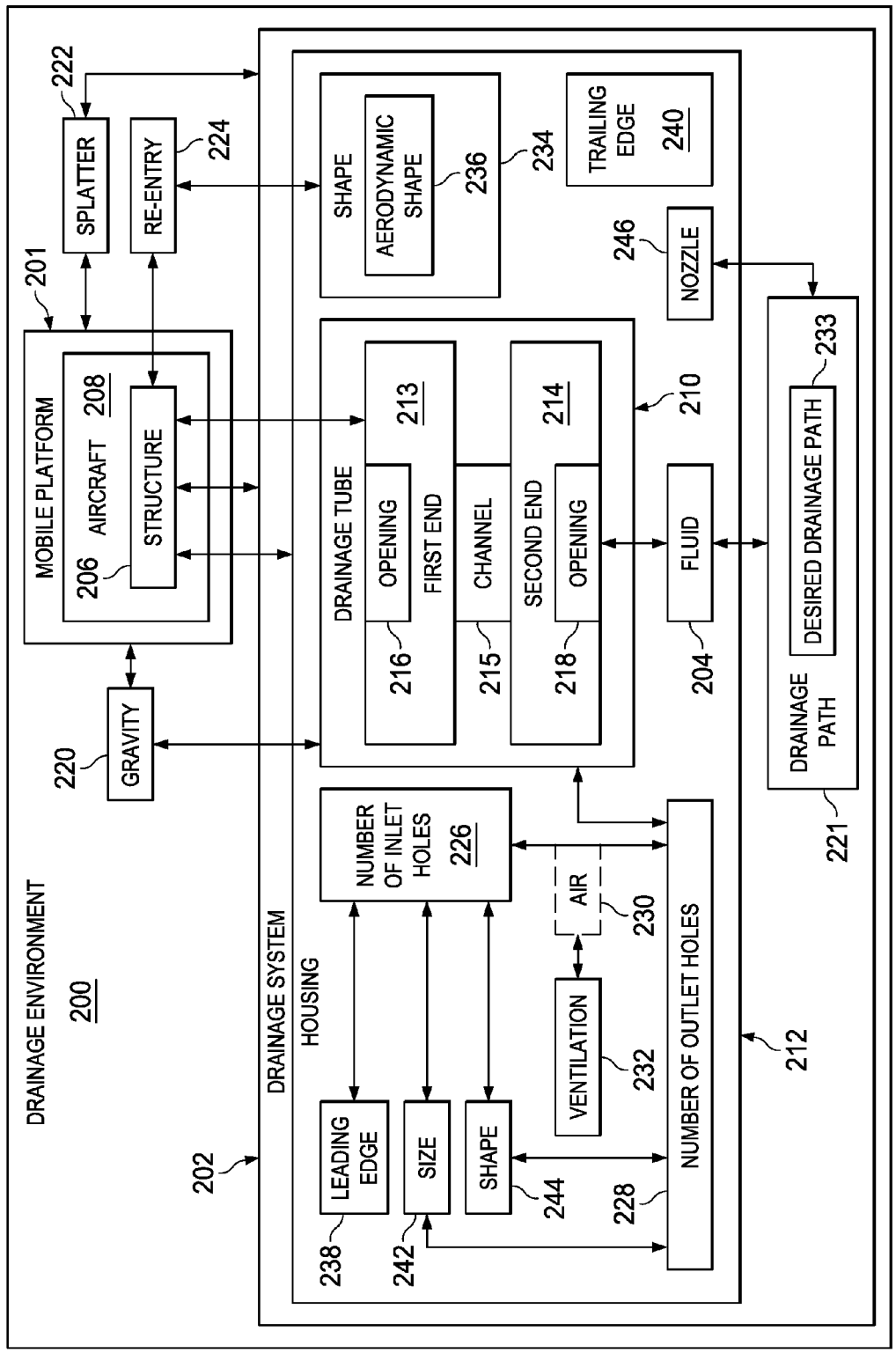
FIG. 2 is an illustration of a block diagram of a drainage environment in accordance with an illustrative embodiment.

Turning next to FIG. 2, an illustration of a block diagram of a drainage environment is depicted in accordance with an illustrative embodiment. Drainage environment 200 is an example of an environment in which drainage system 202 is used to drain fluid 204 from structure 206. Drainage system 120 in FIG. 1 is an example of a physical implementation for drainage system 202 shown in block form in this figure.

As depicted, drainage system 202 is connected to structure 206 to prevent fluid 204 from collecting in structure 206. In this illustrative example, fluid 204 is liquid that is unneeded for operation of structure 206. For instance, fluid 204 may be fluid leaking from components within structure 206.

As another example, fluid 204 may be condensation formed on a surface of structure 206. In yet another illustrative example, fluid 204 may be normal fluid loss from a mechanical system housed within structure 206. Fluid 204 may comprise at least one of oil, water, a hydraulic fluid, fuel, a coolant, or some other type of fluid in this illustrative example.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

It may be undesirable for fluid 204 to collect within structure 206. For example, fluid 204 within structure 206 may decrease the efficiency of structure 206, corrode structure 206, or otherwise become undesirable.

In this depicted example, structure 206 may take various forms. For example, without limitation, structure 206 may be selected from one of a skin panel, a wing, a compartment, a tank, a drive system, a control surface, a nacelle, a power supply system, a wheel-well blister, a window, a windshield, and other suitable types of structures.

As depicted, structure 206 is physically associated with mobile platform 201. A first component, structure 206, is considered to be physically associated with a second component, mobile platform 201, by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, an extension of the second component, or both.

In this depicted example, mobile platform 201 takes the form of aircraft 208. Aircraft 100 shown in FIG. 1 is an example of a physical implementation of aircraft 208 shown in block form in this figure.

In other illustrative examples, however, mobile platform 201 may take other forms. For example, without limitation, mobile platform 201 may be a surface ship, a tank, a personnel carrier, a train, an automobile, and other suitable platforms. In this manner, mobile platform 201 may be a vehicle.

As illustrated, drainage system 202 extends outward from structure 206 to drain fluid 204 from the interior of structure 206 into the environment around structure 206. Drainage system 202 comprises a number of components. In this illustrative example, drainage system 202 includes drainage tube 210 and housing 212. Drainage tube 210 is an object that drains fluid 204 from structure 206.

As depicted, drainage tube 210 has first end 213, second end 214 opposite first end 213, and channel 215. First end 213 of drainage tube 210 has opening 216. Second end 214 of drainage tube 210 has opening 218.

In this depicted example, first end 213 of drainage tube 210 is connected to structure 206 on aircraft 208. Drainage tube 210 is in fluid communication with structure 206 at first end 213. Drainage tube 210 is also in fluid communication with the environment surrounding structure 206 at second end 214.

In an illustrative example, a component is in fluid communication with another component when a fluid may flow from one component to another component. In this manner, fluid 204 flows from structure 206 through opening 216 in first end 213 of drainage tube 210, through channel 215, and out opening 218 in second end 214. Gravity 220 causes fluid 204 to flow through drainage tube 210 in this manner.

When aircraft 208 is in flight, however, gravity 220 is insufficient to drain fluid 204 in a manner that prevents fluid 204 from contacting structure 206, other portions of aircraft 208, or both. In other words, drainage path 221 of fluid 204 is not directed away from aircraft 208.

Instead, the forward motion of aircraft 208 during flight causes splatter 222 of fluid 204 back onto aircraft 208. In this illustrative example, splatter 222 refers to a splash of fluid 204 that contacts one or more structures in aircraft 208. For example, splatter 222 occurs when fluid 204 from drainage tube 210 splashes onto a skin panel in aircraft 208.

In an illustrative example, the forward motion of aircraft 208 during flight also may cause re-entry 224 of fluid 204 into structure 206. Re-entry 224 of fluid 204 occurs when fluid 204 previously drained from structure 206 is re-ingested by structure 206. For instance, re-entry 224 of fluid 204 occurs when fluid 204 previously drained from engine 110 in FIG. 1 re-enters engine 110.

Both splatter 222 and re-entry 224 of fluid 204 are undesirable in this illustrative example. At least one of splatter 222 or re-entry 224 of fluid 204 may degrade performance of aircraft 208, corrode structure 206, cause structure 206 to fail, or a combination thereof.

To reduce at least one of splatter 222 or re-entry 224 of fluid 204, housing 212 is placed over drainage tube 210 such that drainage tube 210 is located within housing 212. Housing 212 is a structure that covers drainage tube 210. In some cases, housing 212 may be referred to as a shield for drainage tube 210.

Housing 212 is connected to structure 206 in this illustrative example. In some cases, drainage tube 210 is physically associated with housing 212.

As depicted, housing 212 includes number of inlet holes 226 and number of outlet holes 228. As used herein, a "number of" items is one or more items. In this depicted example, number of inlet holes 226 includes one or more inlet holes.

In an illustrative example, air 230 flows into housing 212 through number of inlet holes 226 during flight of aircraft 208. Air 230 circulates through housing 212 and flows out of housing 212 through number of outlet holes 228. In this manner, number of inlet holes 226 provides ventilation 232 for housing 212.

The addition of housing 212 to drainage tube 210 directs fluid 204 away from aircraft 208 without lengthening drainage tube 210. Specifically, air 230 flowing into housing 212 through number of inlet holes 226 and out of housing 212 through number of outlet holes 228 directs fluid 204 out of drainage tube 210 and away from structure 206 during flight of aircraft 208. This flow of air 230 through housing 212 results in desired drainage path 233 for fluid 204. Desired drainage path 233 is a path for drainage of fluid 204 that reduces splatter 222 of fluid 204 on aircraft 208. Re-entry 224 of fluid 204 into structure 206 is also reduced or eliminated when fluid 204 has desired drainage path 233.

In this depicted example, housing 212 has shape 234. Shape 234 is a configuration for housing 212 that reduces drag on housing 212 during flight of aircraft 208. In this manner, shape 234 is aerodynamic shape 236 for housing 212.

As shown, housing 212 has leading edge 238 and trailing edge 240. Leading edge 238 is the portion of housing 212 that first contacts the air. In other words, leading edge 238 is the forward portion of housing 212. Trailing edge 240 is the portion of housing 212 opposite leading edge 238. In some illustrative examples, aerodynamic shape 236 of housing 212 may be formed such that leading edge 238 is wider than trailing edge 240. Number of inlet holes 226 is located on leading edge 238 of housing 212.

In an illustrative example, size 242 and shape 244 of number of inlet holes 226, number of outlet holes 228, or both may be designed such that a desired amount of air 230, flow of air 230, or both travel through housing 212. For instance, size 242 of each of number of inlet holes 226 may be increased to increase the amount of air 230 entering housing 212. In another illustrative example, size 242 of number of outlet holes 228 may be reduced to increase the speed at which air 230 flows out of housing 212.

In a depicted example, size 242 refers to the dimensions of number of inlet holes 226. For instance, size 242 may be the diameter of a circular hole. Shape 244 may be selected from one of a circular shape, an oblong shape, a hexagonal shape, a square shape, a rectangular shape, an irregular shape, or other suitable shapes.

In some illustrative examples, nozzle 246 may be connected to housing 212. Nozzle 246 may cover number of outlet holes 228. Nozzle 246 is a device that further directs fluid 204 and air 230 away from structure 206. In an illustrative example, nozzle 246 provides more precise direction of fluid 204 and air 230 than open outlet holes.

Housing 212 is configured to direct fluid 204 away from aircraft 208 without adding undesired weight to aircraft 208. For example, housing 212 may be formed from lighter weight materials than some currently used systems. These materials may include, for example, without limitation, composite material, aluminum, titanium, corrosion resistant steel, and other suitable materials. Lightweight materials may be selected for housing 212 since housing 212 does not need to withstand external loads. Housing 212 encounters only aero loads in this illustrative example.

The illustration of drainage system 202 in FIG. 2 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, drainage system 202 may include more than one drainage tube. In this case, drainage tube 210 is a first drainage tube. A second drainage tube also may be located within housing 212. The second drainage tube may drain fluid 204 from structure 206, structures adjacent to structure 206, or a combination thereof.

Further, although the illustrative embodiments are described with respect to mobile platform 201, and specifically aircraft 208, an illustrative embodiment may be implemented in other platforms that have fluid drainage concerns. The fluid dynamics of an illustrative embodiment are operable to prevent back splatter and re-entry as long as fluid flows through the inlet holes and out of the outlet holes.

Figure 3:
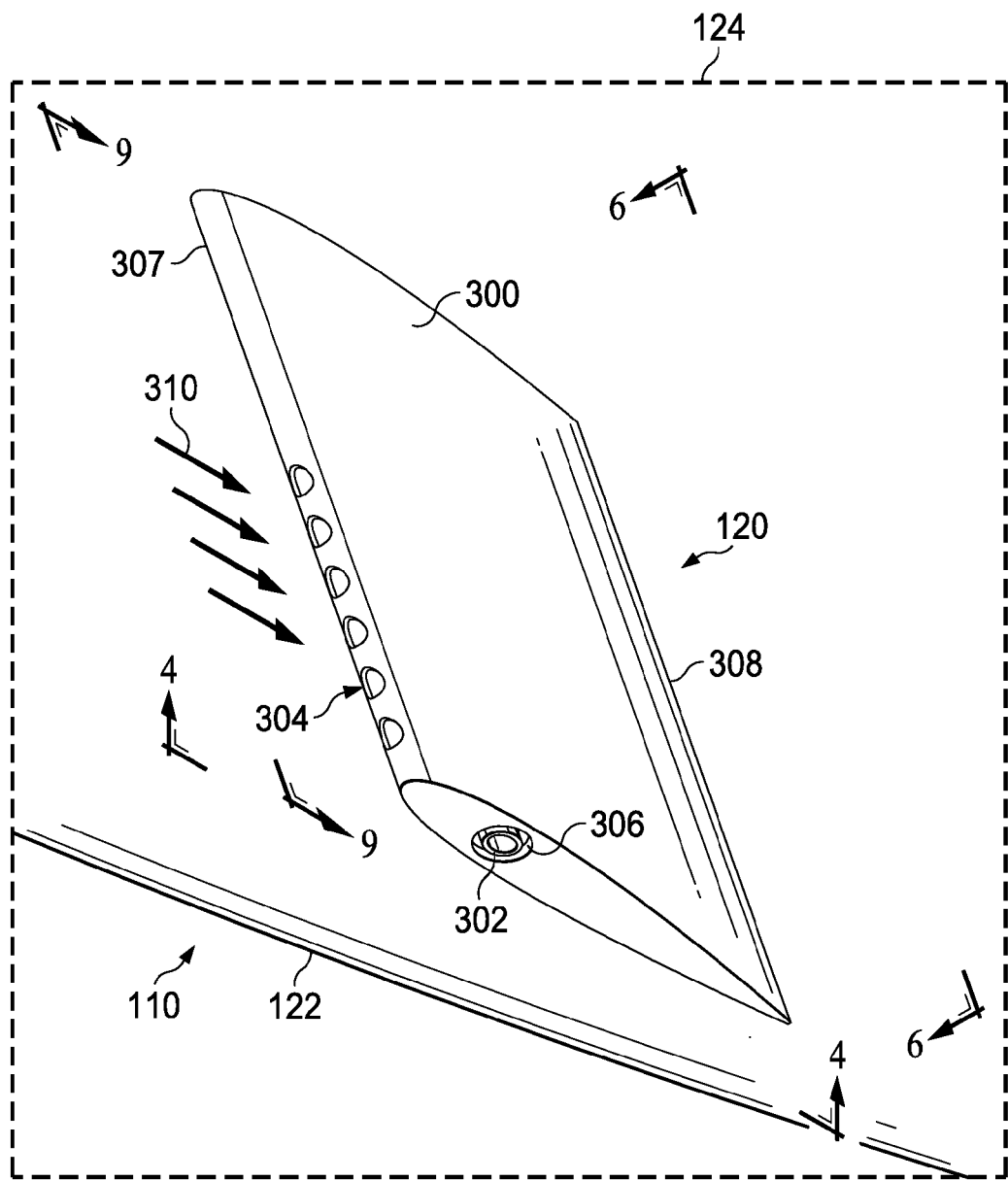
FIG. 3 is an illustration of a drainage system on a nacelle for an aircraft engine in accordance with an illustrative embodiment.

With reference now to FIG. 3, an illustration of a drainage system on a nacelle for an aircraft engine is depicted in accordance with an illustrative embodiment. Section 124 with drainage system 120 extending outward from nacelle 122 for engine 110 of aircraft 100 from FIG. 1 is shown in this view. Engine 110 is an example of a physical implementation for structure 206 shown in block form in FIG. 2.

As shown, drainage system 120 includes housing 300 and drainage tube 302 located within housing 300. Housing 300 is connected to nacelle 122. In this illustrative example, housing 300 and drainage tube 302 are physically associated with nacelle 122. Housing 300 has inlet holes 304 and outlet hole 306.

Inlet holes 304 are located on leading edge 307 of housing 300 in this illustrative example. Specifically, inlet holes 304 are located on the lower half of leading edge 307. Trailing edge 308 is located opposite leading edge 307.

In an illustrative example, air 310 enters housing 300 through inlet holes 304 and exits housing 300 through outlet hole 306. In this manner, air 310 circulates within housing 300 during flight of aircraft 100.

Figure 4:
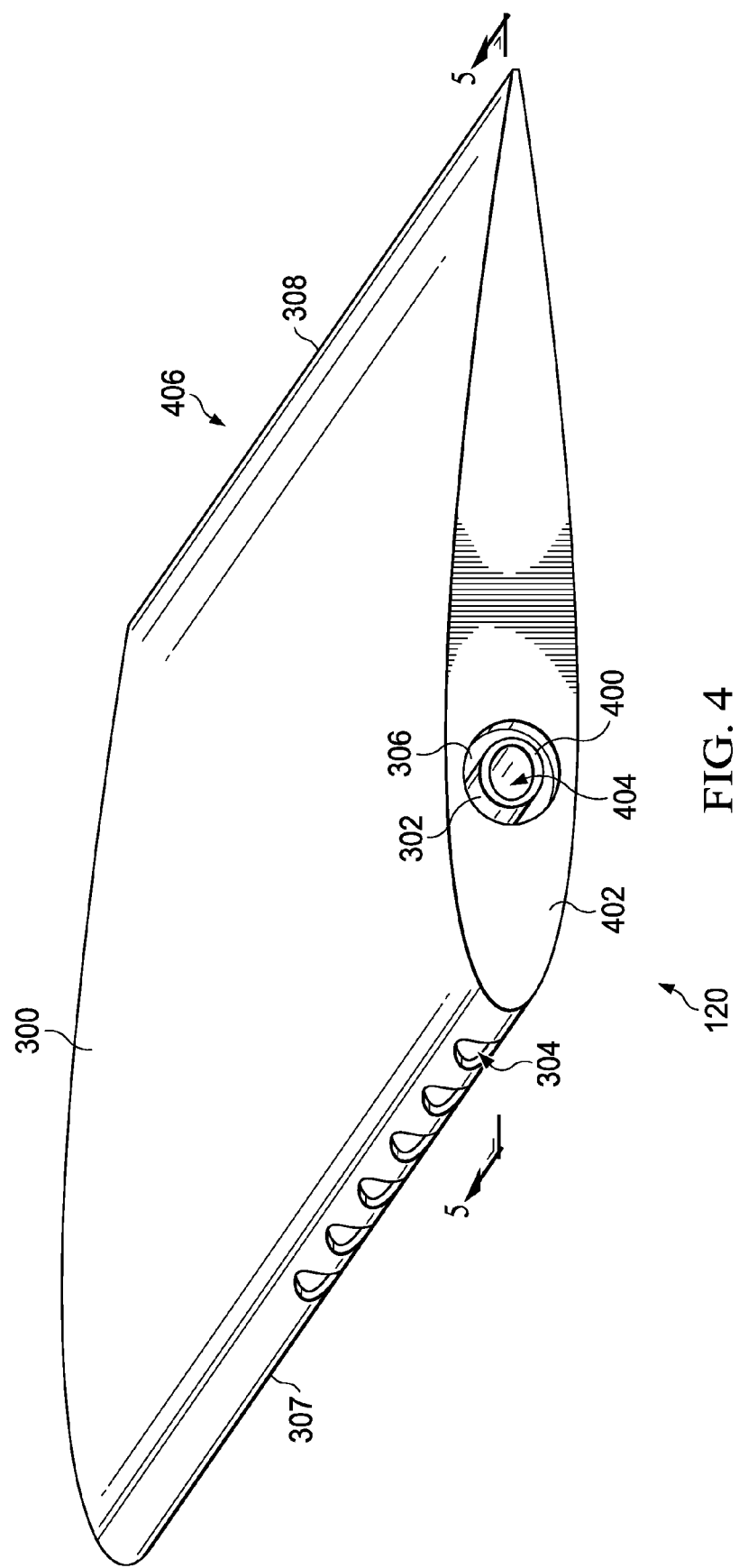
FIG. 4 is an illustration of a drainage system for a nacelle in accordance with an illustrative embodiment.

In FIG. 4, an illustration of a drainage system for a nacelle is depicted in accordance with an illustrative embodiment. In this depicted example, an enlarged bottom view of drainage system 120 is shown in the direction of lines 4-4 in FIG. 3.

As illustrated, a portion of drainage tube 302 extends through outlet hole 306. In this illustrative example, end 400 of drainage tube 302 is substantially flush with bottom surface 402 of housing 300. In other illustrative examples, end 400 of drainage tube 302 may extend slightly outward from bottom surface 402 of housing 300 or may be shorter than housing 300, depending on the particular implementation. In other illustrative examples, bottom surface 402 may be omitted from the design of housing 300.

In this illustrative example, drainage tube 302 has opening 404. Fluid drains from drainage tube 302 through opening 404.

As shown, housing 300 of drainage system 120 has aerodynamic shape 406. Aerodynamic shape 406 is designed such that leading edge 307 of housing 300 is wider than trailing edge 308 of housing 300. The width of housing 300 tapers in the direction of trailing edge 308 to reduce drag on housing 300.

Figure 5:
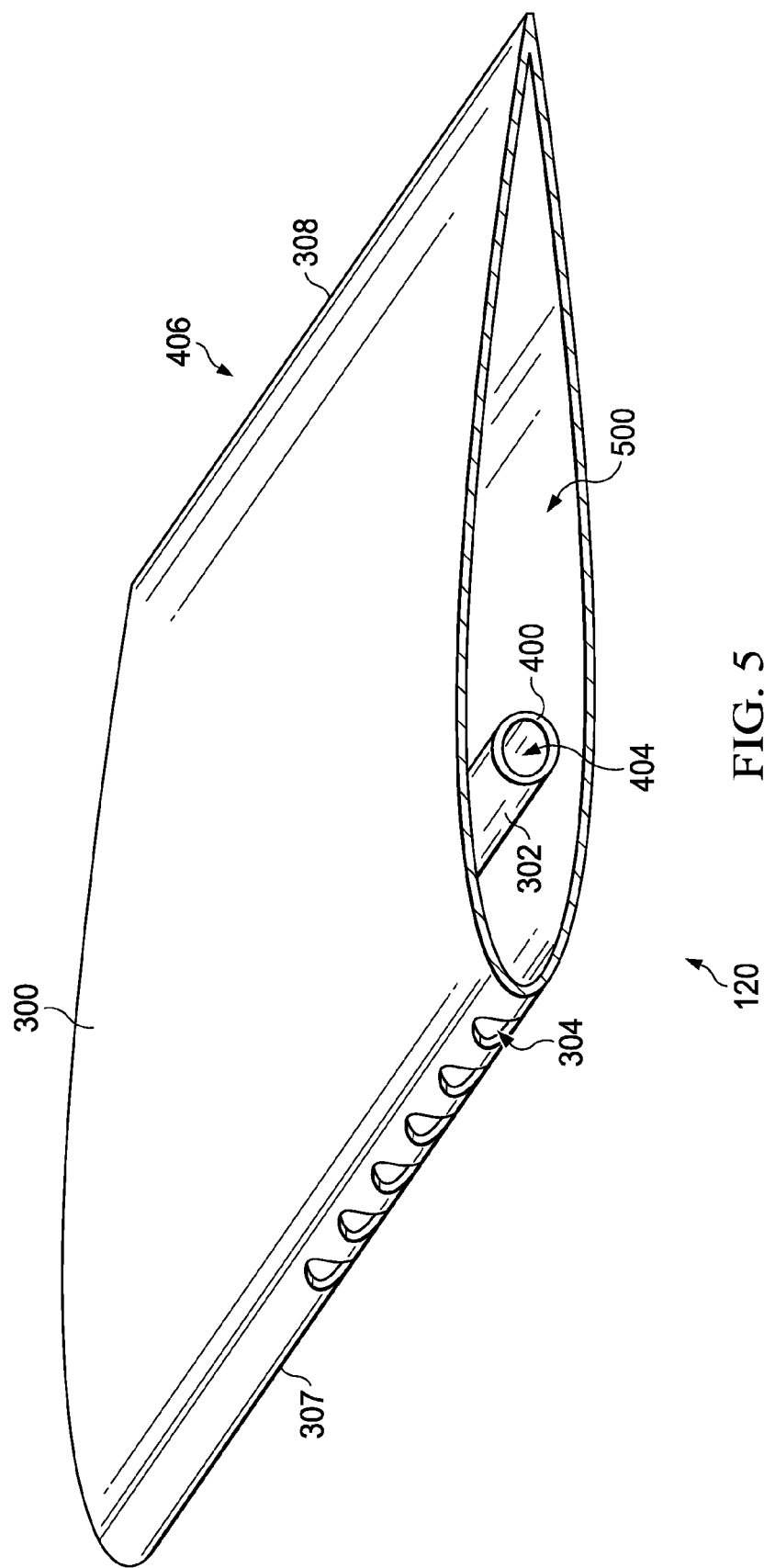
FIG. 5 is an illustration of a cross-sectional view of a drainage system for a nacelle in accordance with an illustrative embodiment.

Referring next to FIG. 5, an illustration of a cross-sectional view of a drainage system for a nacelle is depicted in accordance with an illustrative embodiment. In this illustration, a cross-sectional view of drainage system 120 taken along lines 5-5 in FIG. 4 is shown.

Chamber 500 is seen in this view. Chamber 500 is a space within housing 300 that surrounds drainage tube 302. Air 310 as shown in FIG. 3 circulates through chamber 500 in this illustrative example.

Figure 6:
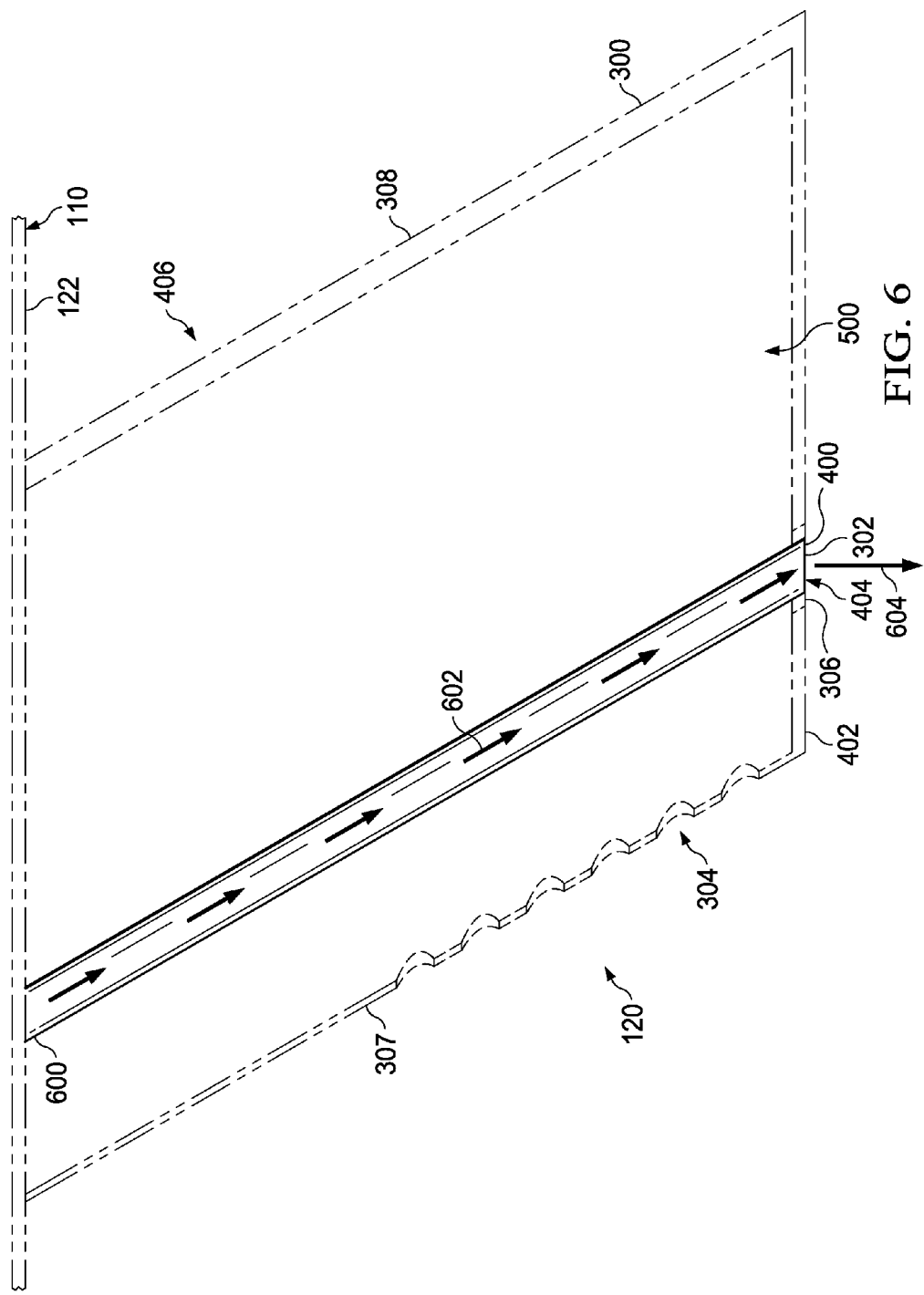
FIG. 6 is an illustration of a side view of a drainage system for a nacelle in accordance with an illustrative embodiment.

Turning now to FIG. 6, an illustration of a side view of a drainage system for a nacelle is depicted in accordance with an illustrative embodiment. In this depicted example, a side view of drainage system 120 is shown in the direction of lines 6-6 in FIG. 3. Housing 300 is shown in phantom such that drainage tube 302 is seen in greater detail.

As illustrated, end 600 of drainage tube 302 is connected to nacelle 122. End 600 also has an opening (not shown in this view) through which fluid 602 flows. Fluid 602 flows from end 600, through drainage tube 302, and out opening 404 into the environment around nacelle 122.

When aircraft 100 is not in flight, drainage tube 302 drains fluid 602 out of nacelle 122 in the direction of arrow 604. Gravity assists in draining fluid 602. As aircraft 100 picks up speed, gravity is insufficient to prevent fluid 602 from splattering back on nacelle 122 or re-entering nacelle 122. The air flowing from housing 300 reduces such splatter and re-entry to fall within selected tolerances.

Figure 7:
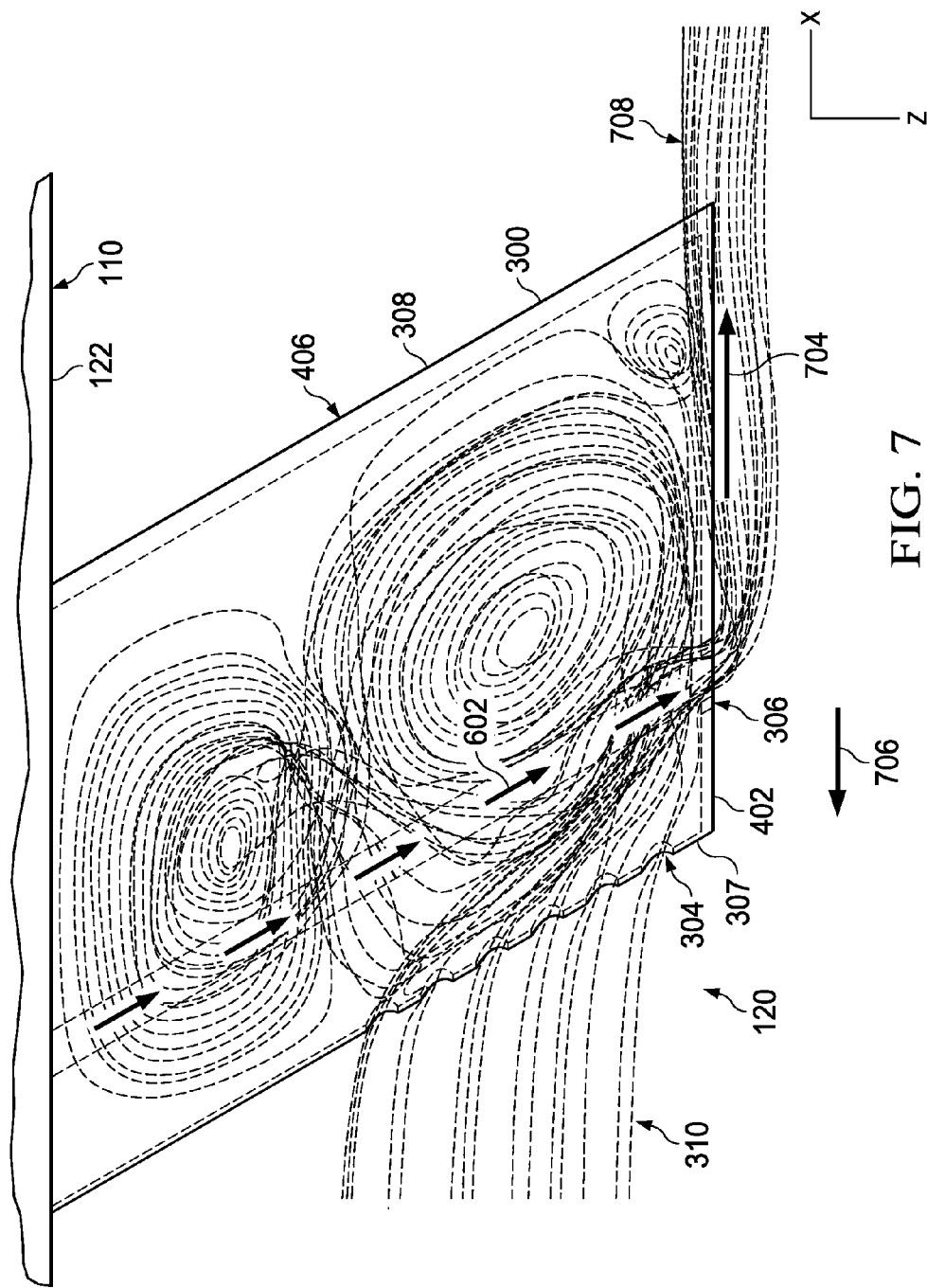
FIG. 7 is an illustration of air flowing within a housing of a drainage system during flight of an aircraft at a first speed in accordance with an illustrative embodiment.
Figure 8:
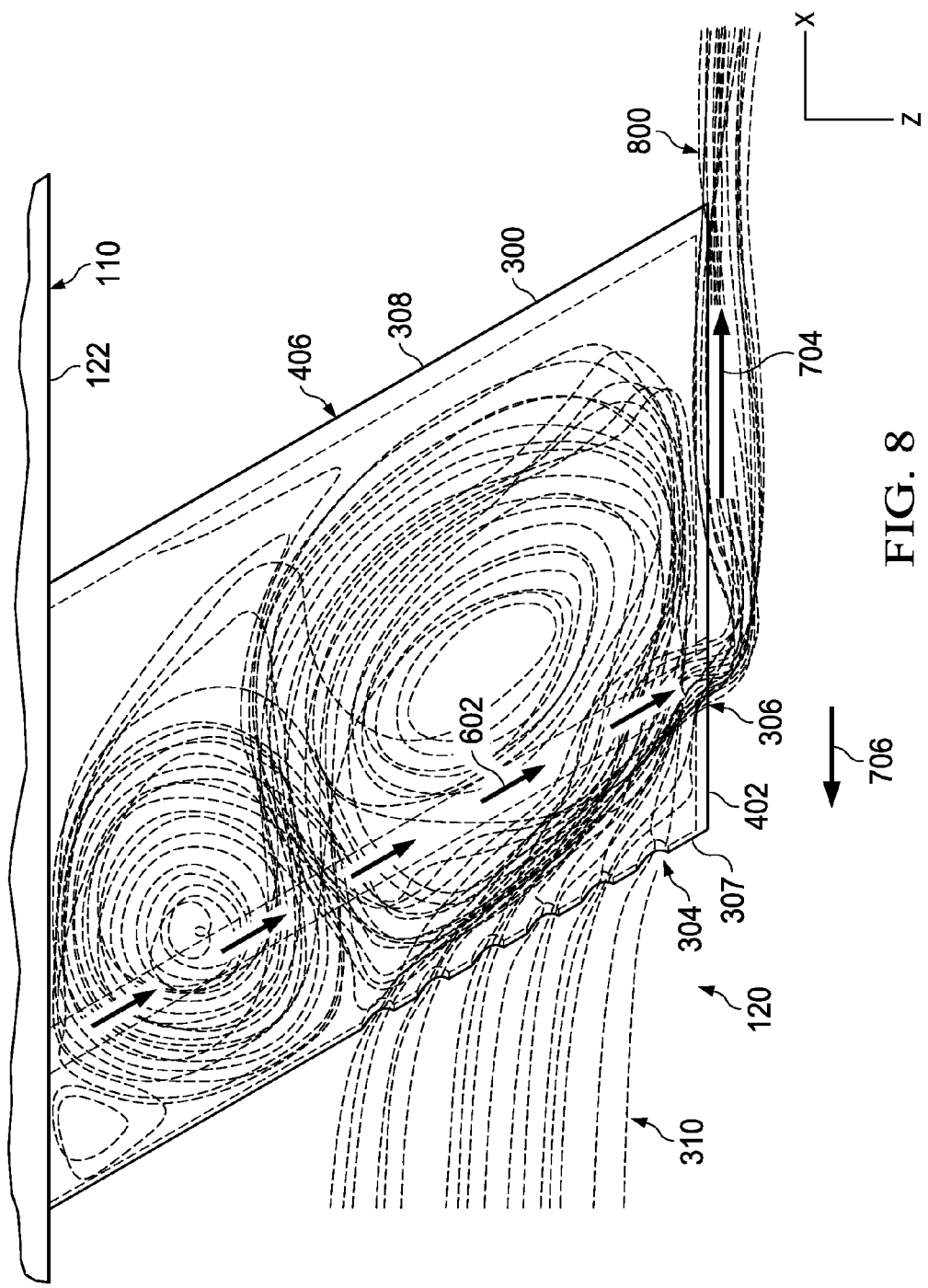
FIG. 8 is an illustration of air flowing within a housing of a drainage system during flight of an aircraft at a second speed in accordance with an illustrative embodiment.

FIGS. 7-8 show illustrations of air 310 flowing within housing 300 of drainage system 120 from FIG. 6 during flight of an aircraft at different speeds. FIGS. 7-8 also depict the drainage path for fluid 602 directed by the flow of air 310 exiting housing 300. These figures show some examples of the path of air 310 flowing inside of housing 300. In particular, air 310 circulates through housing 300 and out of housing 300 in the direction of arrow 704.

In FIG. 7, aircraft 100 is traveling in the direction of arrow 706 at a first speed. Air 310 flows into housing 300 through inlet holes 304 and circulates within chamber 500, shown in FIG. 5, in housing 300. A portion of air 310 then flows out of housing 300 through outlet hole 306. The flow of air 310 directs fluid 602 away from nacelle 122 to reduce or eliminate splatter or re-entry. Drainage path 708 of fluid 602 is shown in this view along with ventilation from air 310.

In FIG. 8, aircraft 100 is traveling in the direction of arrow 706 at a second speed that is faster than the speed of aircraft 100 shown in FIG. 7. Fluid 602 has drainage path 800 in this illustrative example. Air 310 flowing out of housing 300 through outlet hole 306 directs fluid 602 away from nacelle 122 along drainage path 800. In this manner, drainage system 120 reduces or eliminates splatter and re-entry of fluid at various speeds of aircraft 100.

Figure 9:
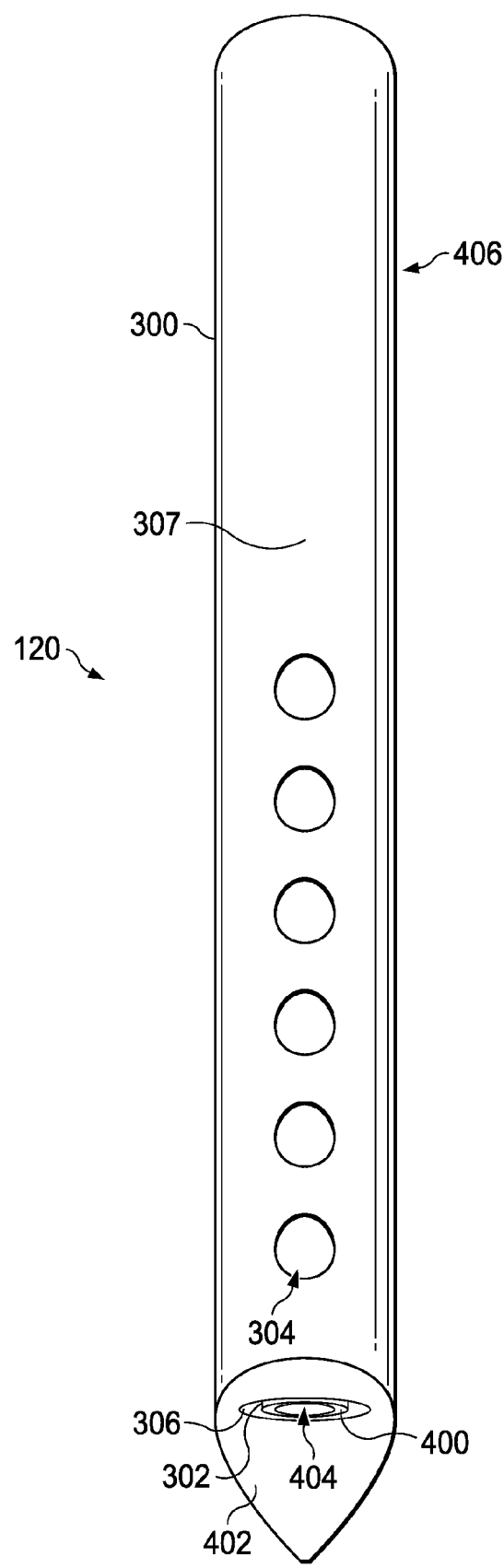
FIG. 9 is an illustration of a front view of a drainage system for a nacelle in accordance with an illustrative embodiment.

Turning next to FIG. 9, an illustration of a front view of a drainage system for a nacelle is depicted in accordance with an illustrative embodiment. As illustrated, a front view of drainage system 120 is shown in the direction of lines 9-9 in FIG. 3. The size and shape of inlet holes 304 is shown in this view.

As shown, adjacent inlet holes 304 are located equidistant from one another. In addition, each of inlet holes 304 has the same shape. In other examples, inlet holes 304 may have different shapes and locations on leading edge 307. Inlet holes 304 intercept a high total pressure in this illustrative example.

Figure 10:
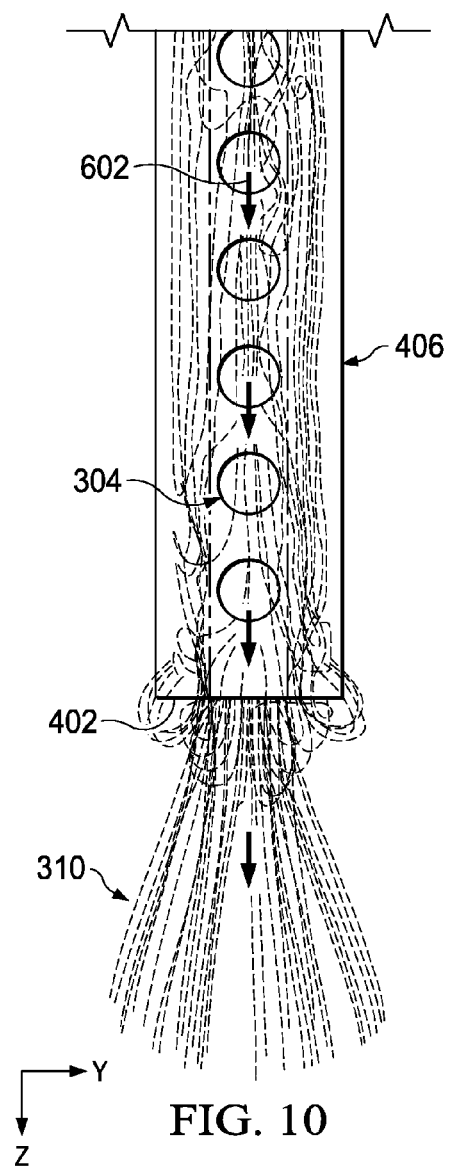
FIG. 10 is an illustration of air flowing out of a housing of a drainage system during flight of an aircraft at a first speed in accordance with an illustrative embodiment.
Figure 11:
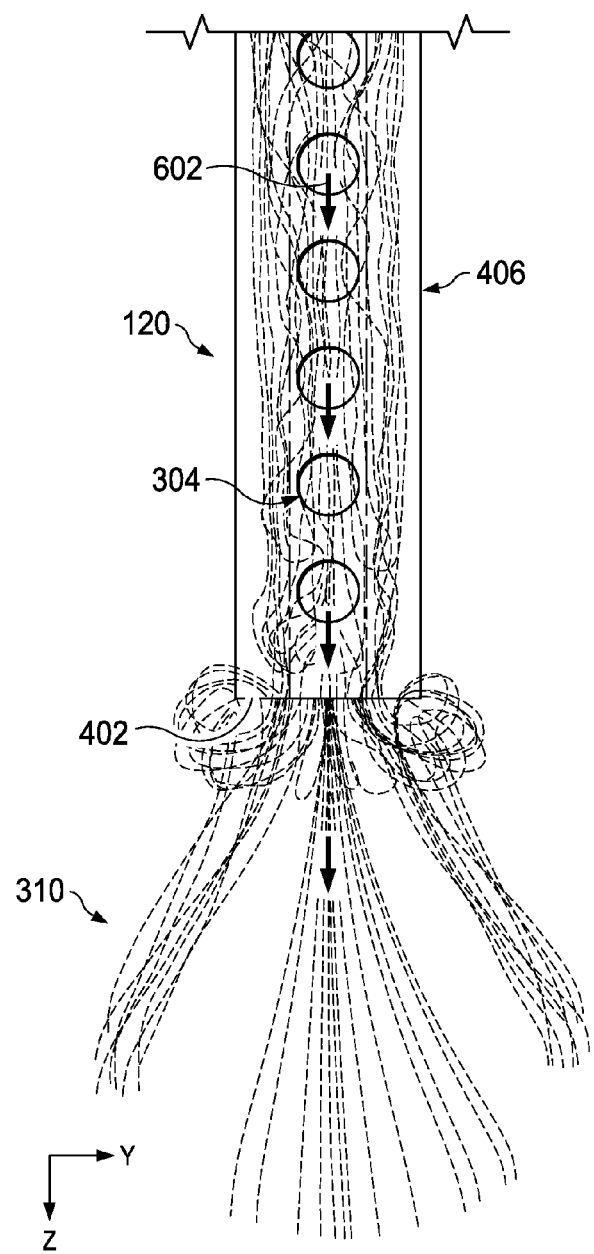
FIG. 11 is an illustration of air flowing out of a housing of a drainage system during flight of an aircraft at a second speed in accordance with an illustrative embodiment.

FIGS. 10-11 are illustrations of drainage system 120 as shown in FIG. 9. FIGS. 10-11 show air 310 flowing out of housing 300 of drainage system 120 during flight of aircraft 100 at different speeds. FIGS. 10-11 also depict the manner in which fluid 602 flows out of drainage tube 302 and away from nacelle 122.

In FIG. 10, aircraft 100 is again traveling at the slower speed. The flow of air 310 out of housing 300 first directs fluid 602 downward before fluid 602 is expelled in the opposite direction of travel of aircraft 100. Even at a higher speed, as shown in FIG. 11, fluid 602 is directed downward and away from nacelle 122 as air 310 flows through housing 300 from inlet holes 304 and out of outlet hole 306.

Figure 12:
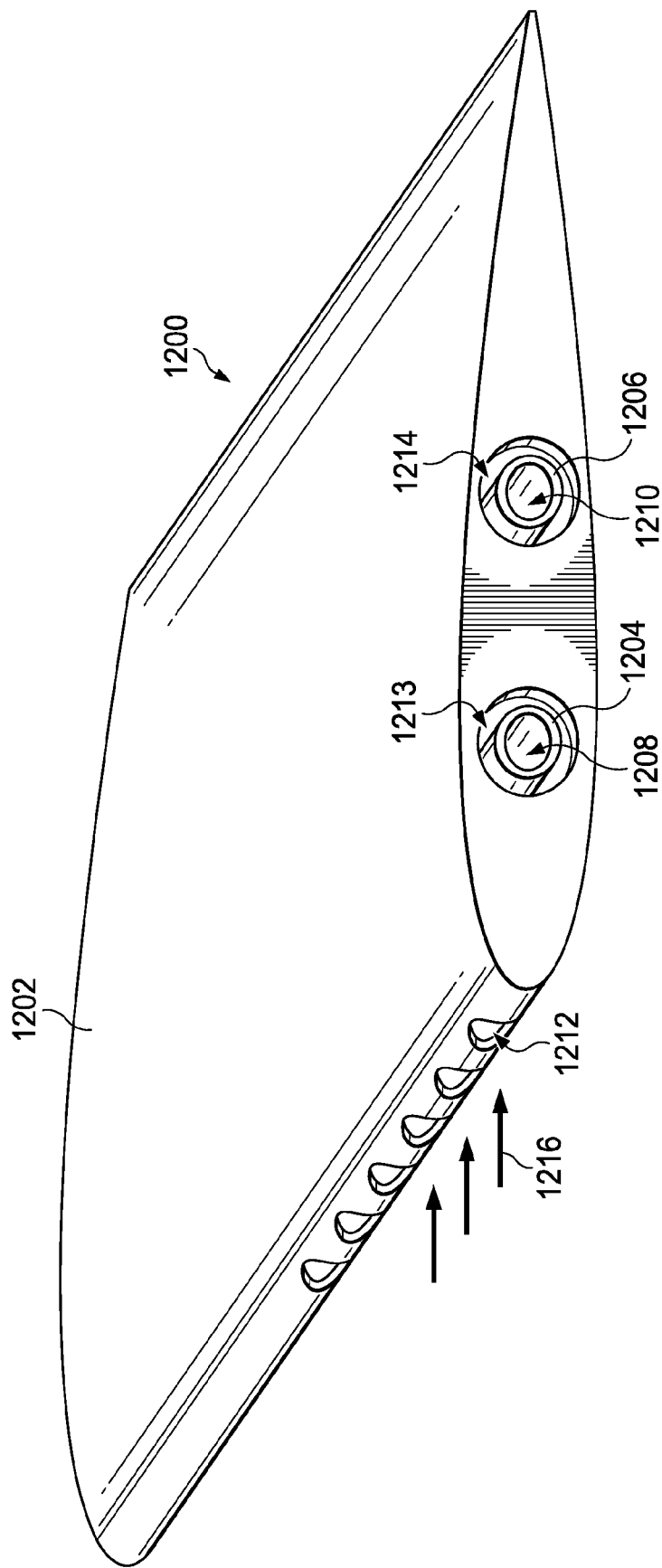
FIG. 12 is an illustration of an enlarged view of a drainage system with two drainage tubes in accordance with an illustrative embodiment.

With reference next to FIG. 12, an illustration of an enlarged view of a drainage system with two drainage tubes is depicted in accordance with an illustrative embodiment. In this illustrative example, an enlarged view of drainage system 1200 is shown. Drainage system 1200 is an example of an implementation for drainage system 202 attached to an aircraft structure shown in block form in FIG. 2.

As depicted, drainage system 1200 includes housing 1202, drainage tube 1204, and drainage tube 1206. Drainage tube 1204 has opening 1208 and drainage tube 1206 has opening 1210. In this depicted example, drainage tube 1204 and drainage tube 1206 drain fluid (not shown in this view) from one or more aircraft structures.

Housing 1202 of drainage system 1200 has inlet holes 1212, outlet hole 1213, and outlet hole 1214 in this illustrative example. Air 1216 flows into housing 1202 through inlet holes 1212 and out of housing 1202 through outlet hole 1213 and outlet hole 1214.

In an illustrative example, air 1216 flowing out of outlet hole 1213 directs fluid draining from drainage tube 1204 away from the aircraft. In a similar fashion, air 1216 flowing out of outlet hole 1214 directs fluid draining from drainage tube 1206 away from the aircraft. In this manner, housing 1202 reduces or eliminates splatter of the fluid back onto the aircraft, re-entry of the fluid into aircraft structures, or both.

Although two outlet holes are shown in this illustrative example, other numbers of outlet holes may be present in an illustrative embodiment. For example, without limitation, three holes, five holes, ten holes, or some other suitable number of outlet holes may be present in housing 1202.

Further, in another illustrative example, drainage tube 1204 and drainage tube 1206 may share the same outlet hole. In this case, a single outlet hole may have an oblong shape. In yet another illustrative example, the entire bottom portion of housing 1202 may be open.

The illustrations of drainage system 120 and drainage system 1200 in FIG. 1 and FIGS. 3-12 are not meant to imply physical or architectural limitations to the manner in which an illustrative embodiment may be implemented. Other components in addition to or in place of the ones illustrated may be used. Some components may be optional.

The different components shown in FIG. 1 and FIGS. 3-12 may be illustrative examples of how components shown in block form in FIG. 2 can be implemented as physical structures. Additionally, some of the components in FIG. 1 and FIGS. 3-12 may be combined with components in FIG. 2, used with components in FIG. 2, or a combination of the two.

Figure 13:
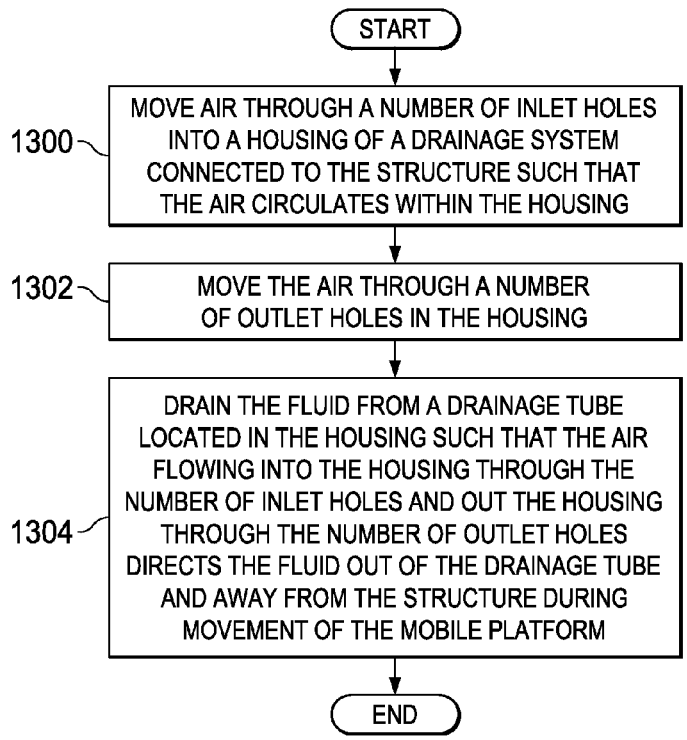
FIG. 13 is an illustration of a flowchart of a process for draining fluid from a structure on a mobile platform in accordance with an illustrative embodiment.

With reference now to FIG. 13, an illustration of a flowchart of a process for draining fluid from a structure on an aircraft is depicted in accordance with an illustrative embodiment. The process illustrated in FIG. 13 may be implemented using drainage system 202 for structure 206 during flight of aircraft 208 in FIG. 2.

The process begins by moving air through a number of inlet holes into a housing of a drainage system connected to the structure such that the air circulates within the housing (operation 1300). Next, the process moves the air through a number of outlet holes in the housing (operation 1302).

The process then drains the fluid from a drainage tube located in the housing such that the air flowing into the housing through the number of inlet holes and out the housing through the number of outlet holes directs the fluid out of the drainage tube and away from the structure during flight of the aircraft (operation 1304), with the process terminating thereafter. During operation 1304, fluid may be drained from one or more drainage tubes at substantially the same time. The air flowing out of the number of outlet holes directs the flow of fluid from each tube.

Figure 14:
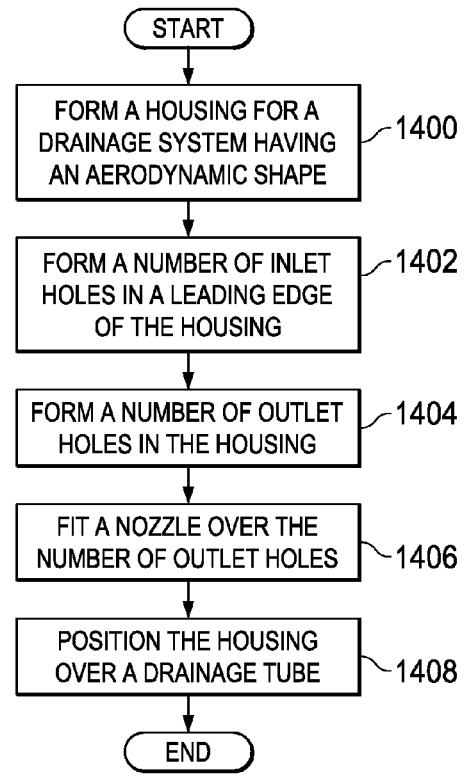
FIG. 14 is an illustration of a flowchart of a process for forming a drainage system for a structure in accordance with an illustrative embodiment.

Turning to FIG. 14, an illustration of a flowchart of a process for forming a drainage system for a nacelle is depicted in accordance with an illustrative embodiment. The process illustrated in FIG. 14 may be implemented to form drainage system 202 for a nacelle in aircraft 208 in FIG. 2.

The process begins by forming a housing for a drainage system having an aerodynamic shape (operation 1400). Next, the process forms a number of inlet holes in a leading edge of the housing (operation 1402). The process then forms a number of outlet holes in the housing (operation 1404).

Thereafter, the process fits a nozzle over the number of outlet holes (operation 1406). In some cases, operation 1406 may be optional.

The process then positions the housing over a drainage tube (operation 1408), with the process terminating thereafter. In operation 1408, the housing may be retrofitted over an existing drainage tube on an aircraft. For instance, the housing may be formed and then positioned over an existing nacelle drainage tube. As another example, the housing may be formed and then added to an existing drainage provision for a wheel-well blister in an aircraft.

Alternatively, the housing and the drainage tube may be formed in one piece. In this case, the drainage system is connected to the aircraft in a single step.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 15:
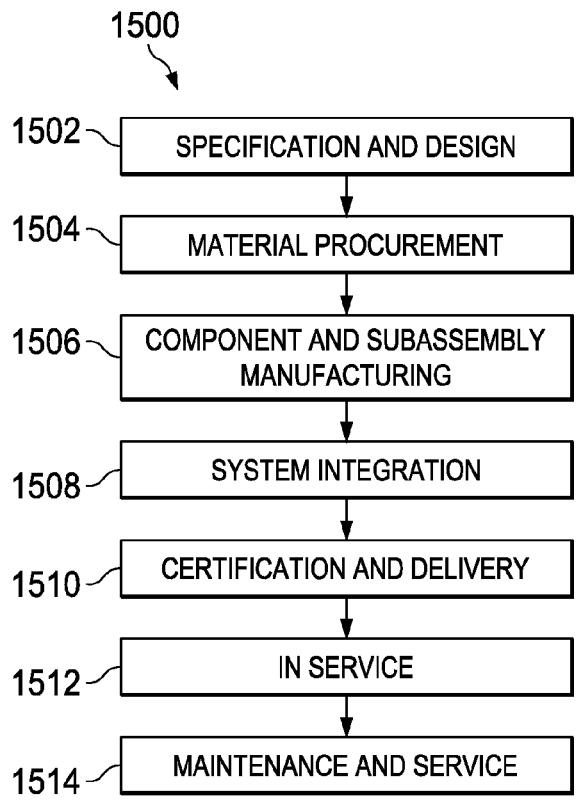
FIG. 15 is an illustration of a block diagram of an aircraft manufacturing and service method in accordance with an illustrative embodiment.
Figure 16:
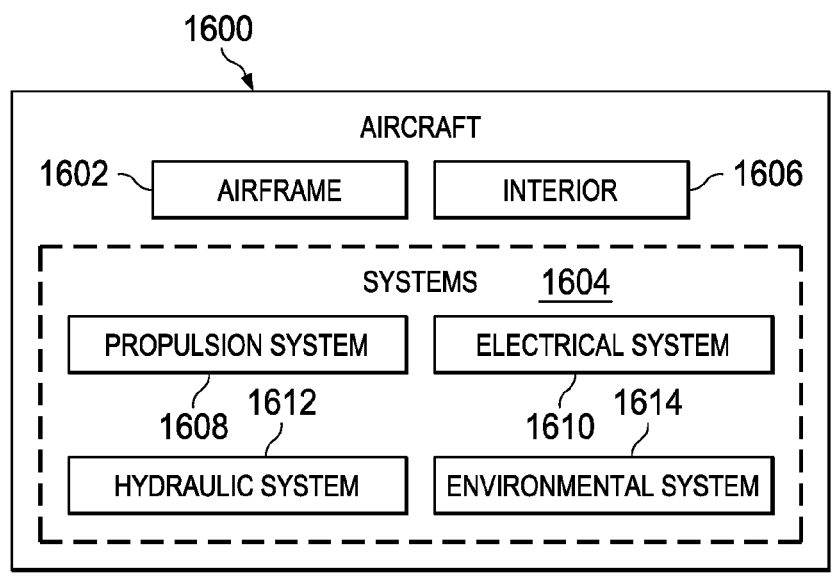
FIG. 16 is an illustration of a block diagram of an aircraft in which an illustrative embodiment may be implemented.

The illustrative embodiments of the disclosure may be described in the context of aircraft manufacturing and service method 1500 as shown in FIG. 15 and aircraft 1600 as shown in FIG. 16. Turning first to FIG. 15, an illustration of a block diagram of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of a block diagram of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. In particular, drainage system 202 from FIG. 2 may be used during any one of the stages of aircraft manufacturing and service method 1500. For example, without limitation, one or more components in drainage system 202 may be manufactured, assembled, and installed in aircraft 1600 during at least one of component and subassembly manufacturing 1506, system integration 1508, or routine maintenance and service 1514. Drainage system 202 may be used to drain fluid 204 from aircraft 1600 while in service 1512. In addition, the effectiveness of drainage system 202 may be tested during certification and delivery 1510 or some other stage of aircraft manufacturing and service method 1500.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512, during maintenance and service 1514 in FIG. 15, or a combination thereof. The use of a number of the different illustrative embodiments may substantially expedite the assembly of aircraft 1600, reduce the cost of aircraft 1600, or both.

Thus, the illustrative embodiments provide a method and apparatus for draining fluid 204 from structure 206 during flight of aircraft 208. An apparatus comprises drainage tube 210, housing 212, number of inlet holes 226 in housing 212, and number of outlet holes 228 in housing 212. Drainage tube 210 has first end 213 that connects to structure 206 on aircraft 208 and second end 214 opposite first end 213. Housing 212 also connects to structure 206. Drainage tube 210 is located within housing 212. Air 230 flows into housing 212, during flight of aircraft 208, through number of inlet holes 226. Air 230 flows out of housing 212, during flight of aircraft 208, through number of outlet holes 228. Air 230 flowing into housing 212 through number of inlet holes 226 and out of housing 212 through number of outlet holes 228 directs fluid 204 out of drainage tube 210 and away from structure 206 during flight of aircraft 208 to prevent splatter 222 of fluid 204, re-entry 224 of fluid 204 into structure 206, or both.

With the use of a ventilated housing surrounding a drainage tube, unneeded fluid may be drained from the aircraft without the risk of back splatter onto aircraft surfaces or re-entry of the drained fluid into the structure. Moreover, the addition of a ventilated housing to a currently installed drainage tube allows the drainage provisions to come into compliance with drainage certification standards without adding undesired weight and complexity to the aircraft. The housing can be formed from lightweight, relatively inexpensive materials. Further, addition of the housing will not impede the function of the drainage tube when the aircraft is static. In this manner, an existing drainage tube and drainage system needs no modification other than the addition of the ventilated housing. As a result, costly rework and replacement of drainage provisions on an aircraft may be avoided.

The illustrative embodiments also provide a solution to reduce or eliminate back splatter and re-entry without lengthening the drainage provision. As a result, the illustrative embodiments save space and may be used effectively in areas of the aircraft with clearance constraints.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a drainage tube having a first end that connects to a structure on an aircraft and a second end opposite the first end;
   a housing that connects to the structure, wherein the drainage tube is located within the housing; wherein the housing comprises a leading edge, a trailing edge opposite the leading edge, and a side edge facing downward and extending between the leading edge and the trailing edge;
   a number of inlet holes in the housing though which air flows into the housing during movement of the aircraft; and
   a number of outlet holes in the side edge of the housing through which the air flows out of the housing during the movement of the aircraft, wherein the air flowing into the housing through the number of inlet holes and out of the housing through the number of outlet holes directs fluid out of the drainage tube and away from the structure during the movement of the aircraft.

2. The apparatus of claim 1, wherein the air flowing into the housing through the number of inlet holes and out of the housing through the number of outlet holes directs the fluid out of the drainage tube and away from the structure such that splatter of the fluid on the aircraft is reduced.

3. The apparatus of claim 1, wherein the drainage tube is a first drainage tube that drains the fluid from the structure and further comprising:
a second drainage tube located within the housing, wherein the second drainage tube drains the fluid from the structure.

4. The apparatus of claim 1 further comprising:
a nozzle connected to the housing and covering the number of outlet holes, wherein the nozzle directs the fluid draining from the drainage tube away from the structure.

5. The apparatus of claim 1, wherein the number of inlet holes is located on the leading edge of the housing.

6. The apparatus of claim 1, wherein the structure is selected from one of a skin panel, a wing, a compartment, a tank, a drive system, a control surface, a nacelle, a power supply system, a wheel-well blister, a window, and a windshield.

7. The apparatus of claim 1, wherein the housing has a shape that reduces drag on the housing during the movement of the aircraft.

8. The apparatus of claim 1, wherein the drainage tube and the housing form a drainage system for the structure that reduces re-entry of the fluid into the structure.

9. A method of draining fluid from a structure on an aircraft, the method comprising:
moving air through a number of inlet holes into a housing of a drainage system connected to the structure, wherein the air circulates within the housing, wherein the housing comprises a leading edge, a trailing edge opposite the leading edge, and a side edge facing downward and extending between the leading edge and the trailing edge;
moving the air through a number of outlet holes in the side edge of the housing; and
draining the fluid from a drainage tube located in the housing, wherein the air flowing into the housing through the number of inlet holes and out of the housing through the number of outlet holes directs the fluid out of the drainage tube and away from the structure during movement of the aircraft.

10. The method of claim 9, wherein moving the air into the housing through the number of inlet holes and out of the housing through the number of outlet holes directs the fluid out of the drainage tube and away from the structure such that splatter of the fluid on the aircraft is reduced.

11. The method of claim 9 further comprising:
directing the fluid from the drainage tube through a nozzle connected to the housing, wherein the fluid flows away from the structure.

12. The method of claim 9, wherein the drainage tube is a first drainage tube and further comprising:
draining the fluid from a second drainage tube located in the housing.

13. The method of claim 9 further comprising: forming the number of inlet holes in the leading edge of the housing.

14. The method of claim 9 further comprising:
forming the housing with an aerodynamic shape configured to reduce drag on the housing during the movement of the aircraft.

15. A drainage system for a structure on an aircraft comprising:
a drainage tube physically associated with the structure that drains a fluid from the structure;
a housing physically associated with the structure, wherein the drainage tube is located within the housing, and wherein the housing comprises a leading edge, a trailing edge opposite the leading edge, and a side edge facing downward and extending between the leading edge and the trailing edge;
a number of inlet holes located on the leading edge of the housing, wherein air flows into the housing through the number of inlet holes during flight of the aircraft; and
a number of outlet holes in the side edge of the housing through which the air flows out of the housing during the flight of the aircraft, wherein the air flowing into the housing through the number of inlet holes and out of the housing through the number of outlet holes directs the fluid out of the drainage tube and away from the structure such that splatter of the fluid on the aircraft is reduced.

16. The drainage system of claim 15, wherein the drainage system reduces re-entry of the fluid into the structure.

17. The drainage system of claim 15 further comprising:
a nozzle connected to the housing, wherein the nozzle directs the fluid draining from the drainage tube away from the structure.

18. The drainage system of claim 15, wherein the drainage tube is a first drainage tube and further comprising:
a second drainage tube located within the housing, wherein the second drainage tube drains the fluid from the structure.

19. The drainage system of claim 15, wherein a shape of the number of inlet holes is selected to provide a desired drainage path for the fluid during the flight of the aircraft.

20. The apparatus of claim 1, wherein the housing comprises an airfoil.

* * * * *